(12) United States Patent
Dolan et al.

(10) Patent No.: US 6,481,780 B2
(45) Date of Patent: Nov. 19, 2002

(54) GOLF BAG COVERS FOR USE WITH GOLF CARTS

(75) Inventors: Frank Dolan, Augusta, GA (US); Robert Hoffman, North Augusta, SC (US)

(73) Assignee: Eagle Parts and Products, Incorporated, Augusta, GA (US)

( * ) Notice: Subject to any disclaimer, the term of this patent is extended or adjusted under 35 U.S.C. 154(b) by 0 days.

(21) Appl. No.: 09/929,811

(22) Filed: Aug. 14, 2001

(65) Prior Publication Data

US 2002/0017803 A1 Feb. 14, 2002

Related U.S. Application Data

(60) Provisional application No. 60/225,141, filed on Aug. 14, 2000.

(51) Int. Cl.[7] .................................................. B60P 7/02
(52) U.S. Cl. ........................ 296/100.18; 296/100.16; 280/DIG. 5
(58) Field of Search ...................... 296/136, 100.01, 296/100.16, 100.17, 100.18, 102; 280/DIG. 5, DIG. 6; 135/88.01, 88.02, 88.09; 150/159

(56) References Cited

U.S. PATENT DOCUMENTS

| | | | |
|---|---|---|---|
| 4,334,692 A | * | 6/1982 | Lynch |
| 4,830,037 A | * | 5/1989 | Held ..................... 280/DIG. 5 |
| 5,069,481 A | * | 12/1991 | Strange ................. 280/DIG. 5 |
| 5,146,967 A | * | 9/1992 | Chapman ..................... 150/159 |
| 5,741,041 A | * | 4/1998 | Sullivan ............... 135/88.09 X |
| 6,068,325 A | * | 5/2000 | Hughes ................. 296/100.16 |
| 6,216,714 B1 | * | 4/2001 | Tucker .................... 135/88.01 |
| 6,220,647 B1 | * | 4/2001 | Winkler ................. 296/100.14 |
| 6,227,217 B1 | * | 5/2001 | Peta |
| 6,227,603 B1 | * | 5/2001 | Brock ................... 296/100.14 |
| 2002/0027337 A1 | * | 3/2002 | Winkler ................. 296/100.14 |

FOREIGN PATENT DOCUMENTS

JP 216215 * 11/1999

* cited by examiner

Primary Examiner—Joseph D. Pape
(74) Attorney, Agent, or Firm—Alston & Bird LLP

(57) ABSTRACT

A golf bag cover attachment for the rear compartment of a golf cart that protects golf bags and equipment from inclement weather, such as rainfall. The golf bag cover attachment includes a plurality of elongate members that are secured together to form a semi-rigid structure that can be selectively moved into and out of an operative condition to cover the equipment platform on which the golf bags are placed. The golf bag cover attachment is strong, lightweight, durable, easy to install, and can be attached to golf carts with little effort.

14 Claims, 4 Drawing Sheets

GOLF BAG COVERS FOR USE WITH GOLF CARTS

RELATED APPLICATION DATA

The present application claims priority from U.S. Provisional Patent Application Ser. No. 60/225,141, filed Aug. 14, 2000, titled "Golf Bag Cover Attachment For Use With Golf Carts", the entire contents of which are incorporated herein by reference.

FIELD OF THE INVENTION

This invention relates generally to golfing accessories, and more specifically, to a cover attachment for use with golf carts.

BACKGROUND OF THE INVENTION

Golf carts are commonly used as a convenient means of transportation to carry golfers and their equipment through a golf course. They are particularly helpful because golfers otherwise grow tired walking a course due to course length and often hilly course terrain. Furthermore, where the carts include a cover or roof, they serve as a helpful retreat for golfers from inclement weather.

To hold golf equipment golf carts usually provide a rear equipment platform on which a golf bag and clubs may be placed and secured during use of the cart. This equipment platform is usually uncovered, even where the golf cart includes a roof covering the seating area. As a result, golf bags and clubs are not protected from inclement weather, such as rainfall. This can both damage the golfing equipment, and also prove perilous to the golfer's game, as the golfer's grip on his clubs may be adversely effected if the club grips become wet. Although golf bags typically include a removable cover that can be snapped in place over the clubs, such covers typically do not permit access to the clubs within the bag. Furthermore, such covers typically cover only the top of the bag, rather than the bag in its entirety. Therefore, it would be desirable to provide means for protecting his bag and clubs from weather precipitation while the bag an d clubs a re positioned in the rear compartment of a golf cart.

SUMMARY OF THE INVENTION

The present invention provides a new and improved golf bag cover attachment for the rear compartment of a golf cart that protects golf bags and equipment from inclement weather, such as rainfall. According to the present invention, the golf bag cover attachment can be selectively moved into and out of a n operative condition to cover the equipment platform on which the golf bags are placed. The golf bag cover attachment i s strong, lightweight, durable, easy to install, and can be attached to conventional golf carts with little effort.

According to one aspect of the present invention, there is disclosed a golf bag cover attachment for use with a golf cart that has a seat, a backrest against which a golfer can sit, a roof and an equipment platform. The golf bag cover attachment includes a seat mount, secured to the backrest, a plurality of elongate frame members, secured together to form a semi-rigid frame structure, where the semi-rigid frame structure is removably secured to the seat mount, and material disposed over at least a portion of the semi-rigid frame structure such that at least a portion of the equipment platform is covered by the material.

According to one aspect of the invention, the semi-rigid frame structure is also secured to the roof. According to another aspect of the invention, the seat mount includes a through hole, through which a bolt can be placed to mount the seat mount to the backrest. According to yet another aspect of the invention, the material is removably attached to the semi-rigid frame structure. The material may also consist of a fabric selected from the group consisting of canvas, nylon and plastic.

Furthermore, according to the present invention, the seat mount includes at least one projection to which the semi-rigid frame structure is removably affixed. The least one projection can also include a through hole, and the semi-rigid frame structure may be removably affixed to the seat mount with a pin placed through the through hole. Additionally, the seat mount may include an integral extension member projecting towards the equipment platform, as well as a backrest hole, through which a bolt can be placed to mount the seat mount to the backrest. According to another aspect of the invention, the at least one projection may be laterally displaced from the backrest hole by an elongate portion of the seat mount. According to yet another aspect of the invention, each of the plurality of elongate frame members may be u-shaped, and constructed of a material selected from the group consisting of steel, aluminum and plastic.

According to another embodiment of the invention, there is disclosed a golf bag cover attachment for use with a golf cart having a seat and a backrest. The golf bag cover attachment includes a plurality of elongate frame members, where the plurality of elongate frame members are secured together to form a semi-rigid frame structure. The semi-rigid frame structure is removably secured to the backrest, and a material disposed over at least a portion of the semi-rigid frame structure such that at least a portion of the equipment platform is covered by the material.

According to yet another embodiment of the present invention, there is disclosed a golf cart attachment for use with a golf cart having a roof and a seat. The golf cart attachment includes a plurality of elongate frame members, where the plurality of elongate frame members are releasably secured together to form a semi-rigid structure, and the semi-rigid frame structure is secured exclusively to the roof and the seat. The golf cart attachment also includes material disposed over at least a portion of the semi-rigid frame structure.

Because golf bag cover attachments according to the present invention can be mounted using pre-existing holes in golf cart backrests the attachments are extremely easy to install and durable. Additionally, the golf bag cover attachments are relatively inexpensive because the use of pre-defined holes for the seat mounts reduces installation time, costs and errors.

BRIEF DESCRIPTION OF THE DRAWINGS

Figure 1:
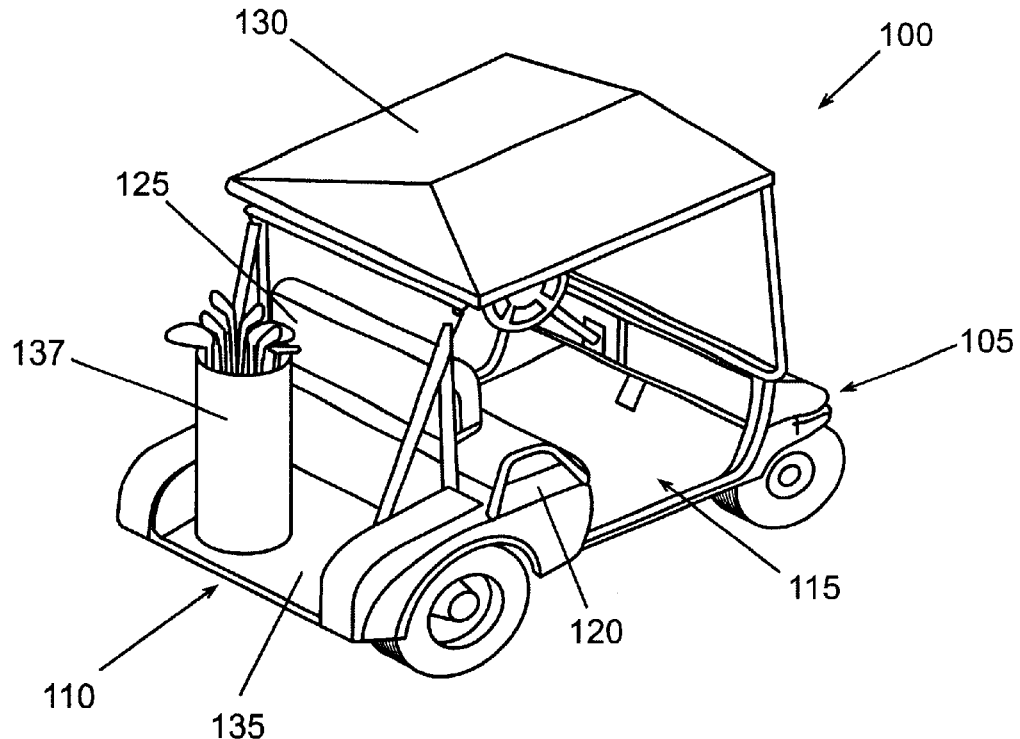

Having thus described the invention in general terms, reference will now be made to the accompanying drawings, which are not necessarily drawn to scale, and wherein:

FIG. 1 is a perspective view of a golf cart, according to one aspect of the invention.

Figure 2A:
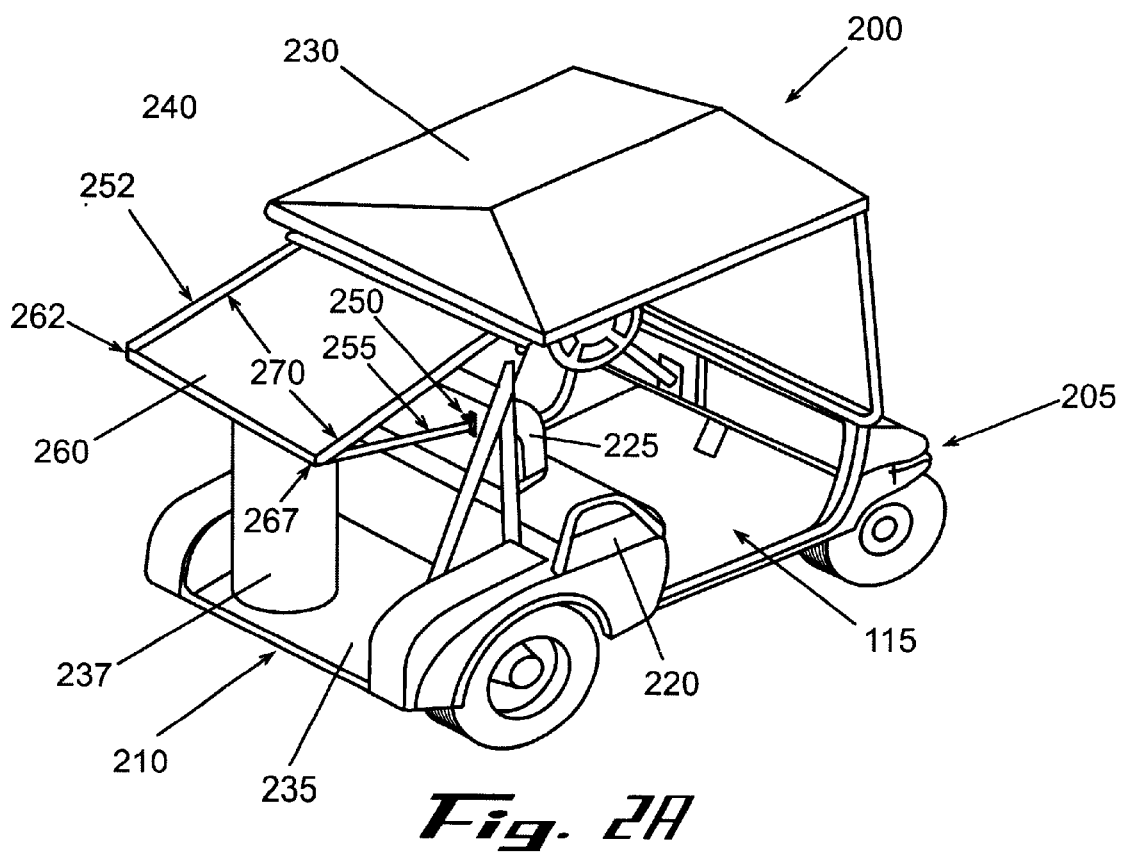

FIG. 2A is a perspective view of the golf cart of FIG. 1 including a golf bag cover attachment, according to one aspect of the pre sent invention.

Figure 2B:
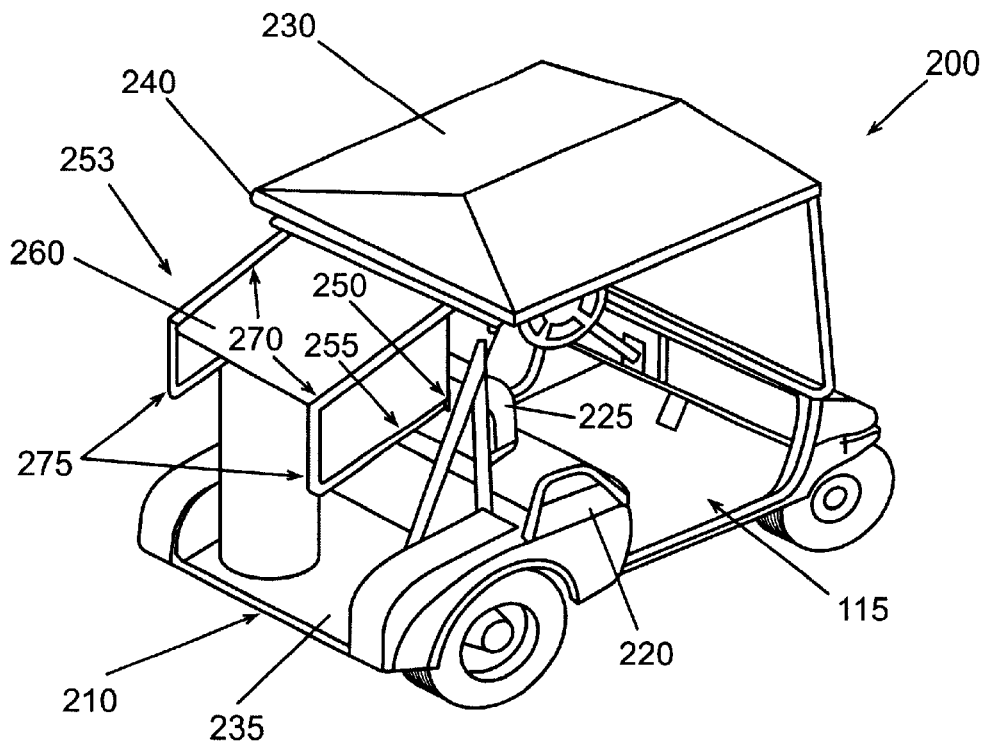

FIG. 2B is a perspective view of the golf cart of FIG. 1 including a golf bag cover attachment, according to another aspect of the present invention.

Figure 2C:
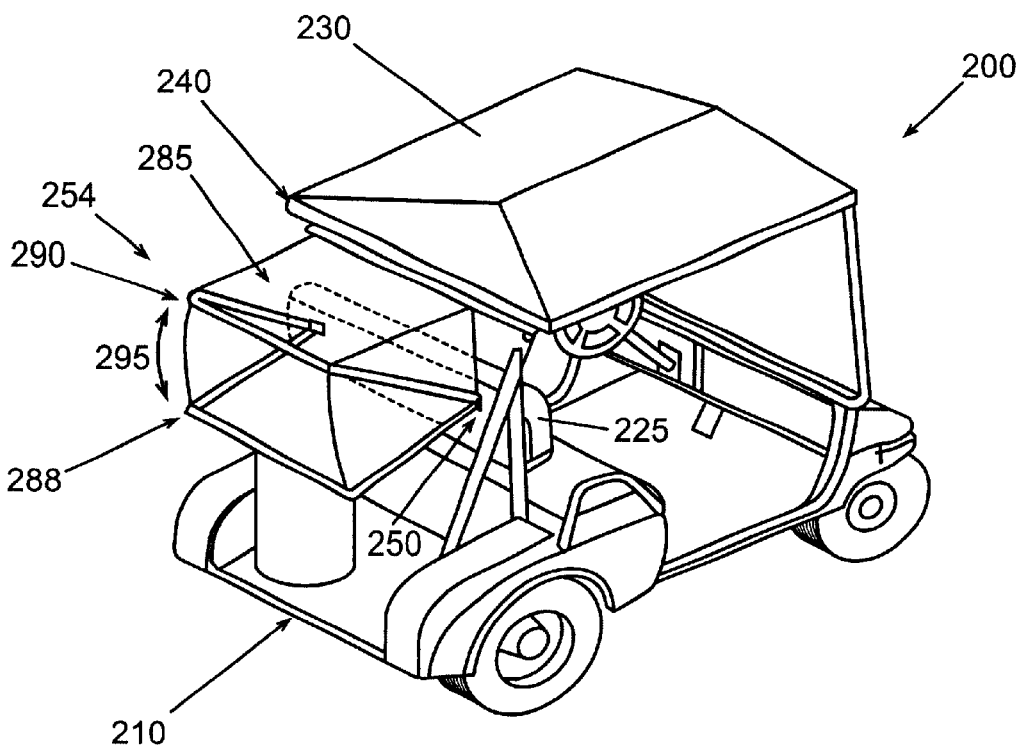

FIG. 2C is a perspective view of the golf cart of FIG. 1 including a golf bag cover attachment, according to yet another aspect of the present invention.

Figure 3A:
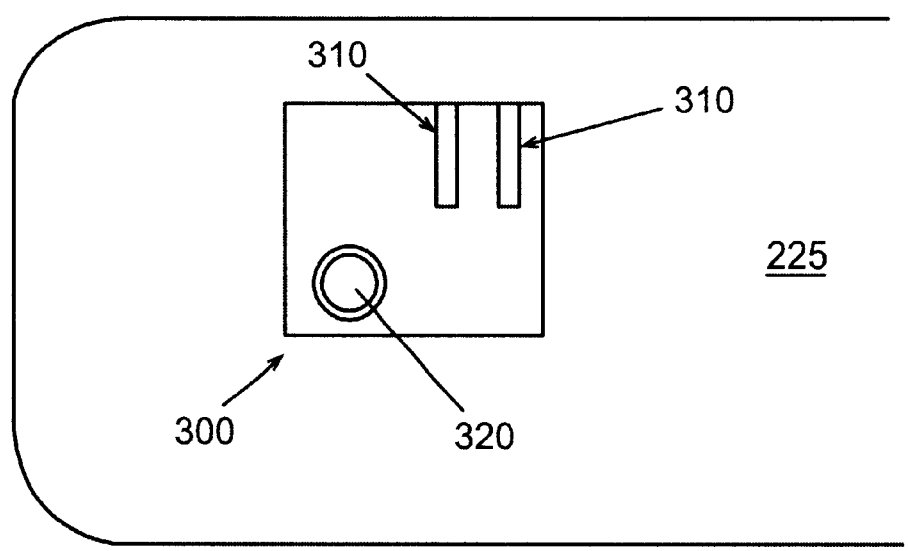

FIG. 3A is a front view of a seat mount attached to the backrest, according to one aspect of the present invention.

Figure 3B:
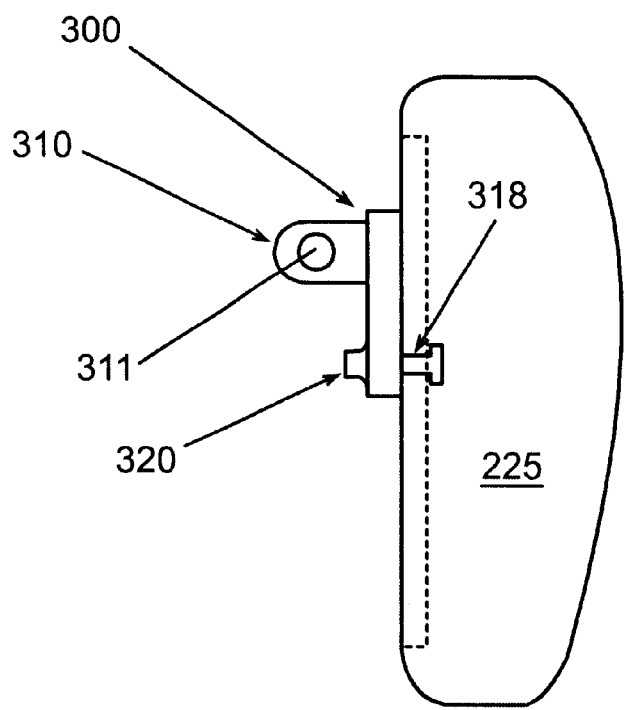

FIG. 3B is a side view of the seat mount of FIG. 3A.

Figure 4:
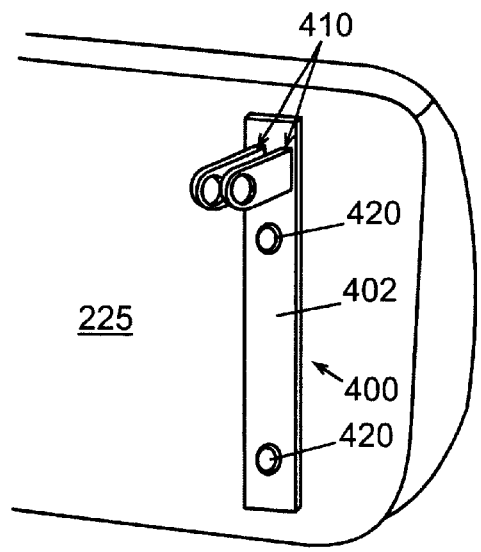

FIG. 4 is a perspective view of a seat mount attached to the backrest, according to another aspect of the present invention.

Figure 5:
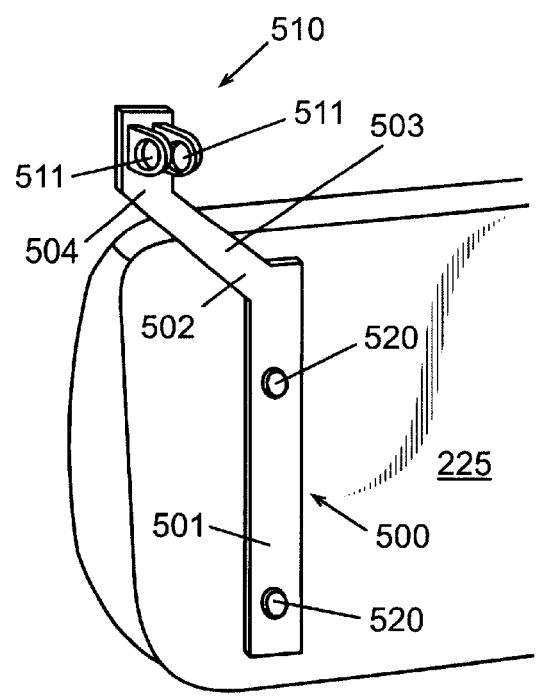

FIG. 5 is a perspective view of a seat mount attached to the backrest, according to yet another aspect of the present invention.

Figure 6:
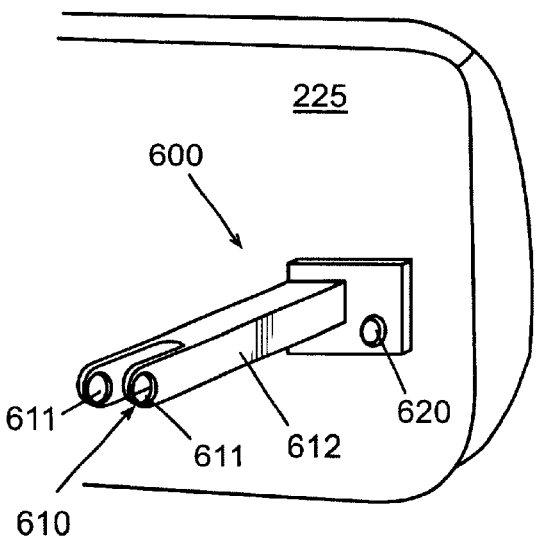

FIG. 6 is a perspective view of a seat mount attached to the backrest and having an integral extension member, according to one aspect of the present invention.

Furthermore, attached are color renditions of FIGS. 3A–6 to more clearly illustrate the structures thereof.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 shows a conventional golf cart 100. The golf cart 100 includes a front end 105, a rear end 110, a roof 130, and a seating compartment 115. The seating compartment 115 includes a seat 120 and a backrest 125. As illustrated in FIG. 1, the golf cart 100 also includes an equipment platform 135, upon which golfing equipment such as a golf bag 137 may be releasably secured, as is well known in the art. The equipment platform 135 is located between the rear end 110 of the golf cart 100 and the seating compartment 115.

FIG. 2A shows a perspective view of the golf cart 100 of FIG. 1, including a golf bag cover attachment 252, according to one aspect of the present invention. The golf cart 200 generally includes a seating compartment 215, in which a seat 220 and backrest 225 are located. Golf cart 200 also includes a rear end 210 and an equipment platform 235 that is generally horizontal to the ground and located between the rear end 210 and the seating compartment 215. As illustrated in FIG. 2A, the purpose of the golf bag cover attachment 252 is to shield the golf bag 237 and equipment located therein from inclement weather, such as precipitation, so that the golf bag 237 and equipment do not get wet.

The golf bag cover attachment 252 is releasably secured to a portion of the backrest 225 facing the rear end of the golf cart 200 through the use of one or more seat mounts 250, which are considered in greater detail below (although only one seat mount on the near side of the backrest 225 is illustrated in FIG. 1, it should be appreciated that a seat mount 225 is also located on the far side of the backrest 225 for affixing the attachment 252 to the backrest on the far side of the cart 200). It is preferred that the seat mounts 250 are removably affixed to the backrest 225 using pre-existing holes in the backrest and one or more bolts and nuts. However, it will be appreciated that the seat mounts 250 may also be attached to the backrest 225 by drilling one or more holes in the backrest through which bolts may be places. The golf bag cover attachment 252 is also releasably secured to the golf cart 200 at the rear frame 240 of the roof 230. The golf bag cover attachment 252 generally includes one or more elongated frame members 255, 265, 270 that support material 260, which covers the golf bag 237 and equipment. Preferably, the material 260 will cover the entirety of the equipment platform 235, and will be constructed of a lightweight material that will not allow water to permeate there through, such as plastic, nylon, canvas, or like water repellant, water resistant or waterproof materials suitable for shielding items from the inclement weather. According to one aspect of the invention the material 260 is clear or transparent so that an unobstructed view of the cart, golf course, and equipment is ensured. The elongated frame members 255, 265, 270 may be constructed of any material strong enough to support their own weight, the material 260, and any precipitation in contact therewith, such as steel, aluminum, titanium, hard plastic, or the like. Preferably, the elongated frame members 255, 265, 270 are also constructed of material that is also lightweight to lighten the golf bag cover attachment 252 and minimize stress on the seat mount 250 and rear frame 240 of the roof 230.

The golf bag cover attachment 252 illustrated in FIG. 2A includes elongated frame members 255, 270 oriented in a lengthwise direction of the golf cart 200, wherein the lengthwise direction of the cart 200 extends generally from the front end of the golf cart to the rear end of the golf cart. The attachment 252 also includes elongated frame members 265 that are substantially perpendicular to the frame members 255, 270. As can be seen in FIG. 2A, the elongated frame members 255, 265, 270 are preferably connected at corners 267. The frame members can be connected to each other and to the rear frame 240 via one or more hinges, clamps, bolts, mounts or other means of securement well known to those of ordinary skill in the art. As a result, the elongated frame members 255, 265, 270 provide a rigid or semi-rigid structure that supports the material 260. This rigid or semi-rigid frame allows the golf bag cover attachment 252 to overhang the equipment platform 235 without obstructing access to the golf bag 237 or rearward view of the persons in the seating compartment 215. Additionally, the rigid or semi-rigid golf bag attachment 252 of the present invention is advantageous because it is supported by elongate frame members 255, 265, 270 that are secured to the golf cart only at the rear frame 240 of the roof and at the seat mounts 250 located on a portion of the backrest 225 facing the rear end 210 of the golf cart 200. This allows the attachment 252 to be mounted on new or existing carts with relative ease and without intruding other features of the golf cart 200 or equipment (e.g., golf bag 237) resting thereon.

Preferably, the one or more hinges, clamps, bolts and mounts securing the frame members 255, 265, 270 to each other and to the backrest 225 and rear frame 240 allow the attachment 252 to be easily removed or folded out of the way when a golfer has no need for the attachment 252. Similarly, it is preferred that the material 260 be releasably secured to the frame members 255, 265, 270 using Velcro, string, zippers, ties, or other means of attachment that allows the material to be removed when not in use or for cleaning. For instance, according to one aspect of the present invention the material 260 may be detached from the frame members 255, 265, 270 and rolled up towards the rear frame 240, where it may then be secured to the roof 230 or rear frame 240 by Velcro or one or more snaps, buttons or the like. Additionally, the frame members oriented in a lengthwise direction of the cart (255, 270) may be detached from one another such that the frame members can hang down near the rear of the backrest 255. This requires that the lengthwise frame members 255, 270 be attached to the rear frame 240 and seat mount 250 in such a way to allow the pivoting of the frame members. This is preferably accomplished with one or more pins affixing the frame members to the cart 200. It will also be appreciated that the frame member 265 positioned perpendicular to the frame members (255, 270) oriented in a lengthwise direction of the cart 200 may remain attached to either frame members 270 or 255, and will rest behind the backrest 225 and near the equipment platform 235 when the attachment is stowed.

Although the embodiment shown in FIG. 2A is one possible configuration of a backrest-mounted golf bag cover attachment 252 according to the present invention, it should be appreciated that other configurations can also be accomplished while still providing the advantages of the present invention. For instance, according to one aspect of the invention, the elongate frame members 265 that are substantially perpendicular to the frame members 255, 270 in FIG. 2A may be removed, and the material 260 may provide the only lateral support for the golf bag cover attachment. As will be discussed below, this may be advantageous where the frame members 255, 270 may be moved out of operative position when not needed by golfers. Furthermore, although the embodiment illustrated in FIG. 2A shows the elongated frame members in a configuration in which the members create v-shaped sides and a substantially flat and sloped overhang, it will be appreciated that the golf bag cover attachment 252 may include additional members or curved elongate frame members to accommodate better access to the golf bag 237, to increase the area covered by the material 260, to strengthen the golf bag cover attachment 252, or facilitate the movement of the attachment into and out of operative position.

FIG. 2B shows a perspective view of the golf cart of FIG. 1, including a golf bag cover attachment 253 according to another aspect of the present invention. Like the golf bag cover attachment 252 illustrated in FIG. 2A, the golf bag cover attachment 253 is releasably secured to the rear frame 240 of the roof 230 and the seat mount 250 mounted on the portion or side of the backrest 225 facing the rear end 210 of the golf cart 200. The golf bag cover attachment 253 is substantially the same as that attachment 252 illustrated in FIG. 2A, but for additional vertical elongated frame members 275 and material 280 and the (optional) deletion of frame member 265. The addition of the vertical elongate frame members 275 and the material 280 on the sides of the attachment help to better protect the golf bag 247 from inclement weather. The vertical frame members 275 may also serve to strengthen the golf bag cover attachment 253. Like the frame members shown in FIG. 2A, the frame members illustrated in FIG. 2B may be affixedly secured by any well known means in the art, including welding, clamps, bolts, hinges, screws, or like fastening means. Furthermore, like the attachment 252 illustrated in FIG. 2A, the material 260 on the top portion of the golf bag cover attachment and material 280 on the sides of the golf bag cover attachment may secured between the elongate frame members by buttons, straps, ties or the like, or may rest over the frame members with minimal securement so that the material simply does not substantially move under adverse conditions, such as in rain or when the cart is moving at full speed. Additionally, it will be appreciated that the material 260, 280 may be one piece of material that is attached to the golf cart at the rear frame 240 of the roof 230, and may be rolled up and tied into position at that location when not in use. Moreover, like the attachment 252 described with respect to FIG. 2A, the attachment 253 illustrated in FIG. 2B may be folded out of the way when not in use. For instance, the seat mounts 250 and clamps, bolts, hinges and other elements securing the attachment permit each set of frame members 275, 255, 270 to be folded inward towards the cart, or removed, when not in use.

FIG. 2C shows a perspective view of the golf cart of FIG. 1, including a golf bag cover attachment 254 according to the preferred embodiment of the present invention. Like the golf bag cover attachment 252 illustrated in FIG. 2A, the golf bag cover attachment 254 is releasably secured to the rear frame 240 of the roof 230 and the seat mount 250 mounted on the side of the backrest 225 facing the rear end 210 of the golf cart 200. The golf bag cover attachment 254 includes elongated frame members 288 and 290 that are generally un-shaped and mounted to the seat mount 250 and/or to each other such that the frame members 288, 290 can be rotated in an direction 295 towards the roof 230 the golf cart when the attachment 254 is in the non-operative state. Furthermore, using u-shaped members 288, 290 can help the attachment 254 maintain its rigidity, as less frame members are required to form the attachment 254. It will be appreciated that because a frame member located directly adjacent the rear end of the roof, the material 285 must be independently attached by straps, buttons, or the like to the rear end 240 of the roof 230. Additionally, there may be one or more such fasteners securing the material 285 to the u-shaped members 288, 290. Furthermore, although not illustrated, it will be appreciated that there may also exist an additional frame member located at the rear end 240 of the roof 230 to facilitate such an attachment.

Like the attachments 252, 253 described with respect to FIGS. 2A and 2B, the attachment 254 may be easily moved out of the way when not in use. However, the attachment 254 illustrated in FIG. 2C provides at least one advantage over the previous embodiments—because the frame members 288, 290 radiate outward from the seatback 225, and rotate toward the roof, the material 285 need not be removed or rolled back when moving the attachment 254 out of the way to when not needed. To facilitate the folding of the attachment 254 and the securement of the attachment 254 out of the way when not in use, the material 285 may include one or more straps, buttons or the like which allow the frame members and material to be affixed to the read end 240 of the roof 230.

FIG. 3 shows a front view of a seat mount 300 attached to the side or portion of the backrest 225 facing towards the rear of the golf cart, according to one aspect of the invention. According to one aspect of the invention, the seat mount 300 is attached to he backrest by a bolt 320 placed through a hole in the seat mount 300 and a corresponding backrest hole 318 in the backrest. Preferably, the seat mount 300 can be located on the backrest in a position corresponding to a pre-existing hole in the backrest so that minimal labor is required to mount the seat mount 300. However, where there is no pre-existing hole in the backrest, the seat mount may require a new hole, or other means of attaching thee seat mount to the backrest may be used.

The seat mount 300 may be constructed of steel, aluminum, plastic, and other relatively strong materials, and generally includes one or more projections 310 that extend generally perpendicularly from the face of the seat mount 300. FIG. 3A shows two such projections 310. The projections include one or more through holes 311 located therein to facilitate the releasable securement of frame members, clamps, brackets or the like to the backrest 225. According to one aspect of the invention, a bolt, cotta pin or like means of securement can be placed through the through holes 311, and through a corresponding frame member (or other structure) so that the two elements will be secured together.

Preferably, this will also allow the frame member or other element to move or rotate in a direction parallel to a plane or planes defined by the one or more projections 310. This will allow the golf bag cover attachment to move under stress so that the attachment will not break, and will also allow the attachment to be placed or stowed in a non-operative condition when not in use. FIG. 3B is a side view of the seat mount 300 of FIG. 3A showing the through holes located in the projections 310.

FIG. 4 is a perspective view of a seat mount 400 attached to the backrest 225 of the golf cart, according to another aspect of the present invention. Like the seat mount illustrated in FIG. 3A and 3B, the mount 400 includes one or more projections 410 that can be used to facilitate securement of the golf bag cover attachment to the backrest. However, as shown in FIG. 4, the seat mount 400 includes an elongate portion 402 placed flush with the rear of the backrest 225 such that a plurality of bolts 420 can secure the seat mount 400 to the backrest 225. The addition of one or more bolts over the structure shown in FIGS. 3A and 3B increases the strength with which the mount 400 is attached to the backrest 225, and also prevents the mount 400 from rotating with respect to the backrest 225. As with the previous embodiment, it is preferred that the bolts 420 securing the mount to the backrest will be aligned with pre-established holes in the backrest such that minimum labor is required to install the seat mount 400.

FIG. 5 is a perspective view of a seat mount 500 attached to the backrest 225, according to yet another aspect of the present invention. As with the embodiment illustrated in FIG. 4, the seat mount 500 includes a plurality of bolts 520 securing an elongate portion 501 to the backrest. However, the seat mount 500 also includes an offset projection member 502 having a proximate end 503 nearest the backrest, and a distal end 504 laterally displayed from the proximate end 503. As can be seen in the figure, one or more projections 510 used to facilitate securement of the golf bag cover attachment to the backrest 225 are located at the distal end 504 of the offset projection member 502. Like the seat mounts 300, 400 illustrated in FIGS. 3A, 3B and 4, the projections include through holes 511 located therein to facilitate the releasable securement of frame members, clamps, brackets or the like to the backrest 225. As in the previous embodiments, a bolt, cotta pin or like means of securement can be placed through the through holes 511, and through a corresponding frame member (or other structure) so that the two elements will be secured together. Displacing the projections 510 laterally from the bolts 520 may be helpful where a frame, support or other golf cart structure, such as a roof support or basket, otherwise prevents the mounting and/or deployment of a golf bag cover attachment. Furthermore, this device can help the golf bag cover attachment be stored in a non-operative state because the lateral displacement of the projections 510 allow one or more frame members to be easily rotated without interference with other golf cart parts.

FIG. 6 is a perspective view of a seat mount 600 attached to a golf cart backrest 225 and having an integral extension member 612, according to one aspect of the present invention. Like the other seat mounts 300, 400, 500 the seat mount 600 includes projections 610 including through holes 611 to which frame members, mounts or the like may be attached, and one or more backrest holes through which bolts 620 may be placed to secure the seat mount 600 to the backrest 225. However, unlike the previous embodiments, the extension member 612 projects to the rear end of the golf cart from the backrest 225 such that the projections 610 can be closer to the rear end of the golf cart than in the other embodiments discussed herein. Displacing the projections 610 towards the back of the cart may be helpful or necessary where a frame, support or other golf cart structure, such as a roof support or basket, otherwise prevents the deployment of a golf bag cover attachment. Furthermore, this may help the golf bag cover attachment to be stored in a non-operative state because the placement of the projections 610 may allow one or more frame members to be easily rotated without interference with other golf cart parts.

Although each seat mount has been described individually with respect to the above embodiments, it should be appreciated by those of skill in the art that multiple embodiments of the seat mount may be combined to produce additional configurations. For instance, the seat mounts discussed above with respect to FIGS. 5 and FIG. 6 may be combined to produce a seat mount that extends towards the rear of the cart, a projects laterally from the position in which it is mounted to the backrest. Additional configurations can also be accomplished to allow the golf bag cover attachment to be placed on a variety of golf carts having various roof support structures, baskets, structural components, and other parts that may otherwise interfere with the attachment of frame members to the seat mount.

Because golf bag cover attachments according to the present invention can be mounted using pre-existing holes in golf cart backrests the attachments are extremely easy to install and durable. Likewise, the golf bag cover attachments are relatively inexpensive because the use of predefined holes for the seat mounts reduces installation time, costs and errors. Additionally, because the golf bag cover attachments are mounted just behind the backrest, golfers can deploy the golf bag cover attachment while sitting in the cart. Furthermore, golf bag cover attachments according to the present invention will not invade the seating compartment of the golf car or otherwise interrupt golfer exit or entrance into the vehicle.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A golf bag cover attachment for use with a golf cart having a seat and a backrest against which a golfer can sit, and further including a roof and an equipment platform, comprising:

a seat mount, wherein the seat mount includes at least one hole, through which at least one bolt can be placed to secure the seat mount directly to the rear face of the backrest, wherein the seat mount includes one or more projections extending generally perpendicularly from the face of the seat mount, and wherein each of the one or more projections include a through hole located therein;

a plurality of elongate frame members, wherein the plurality of elongate frame members are secured together to form a semi-rigid frame structure, and wherein the semi-rigid frame structure is removably secured to the one or more through holes, located in the one or more projections extending generally perpendicularly from the face of the seat mount, and material disposed over at least a portion of the semi-rigid frame structure such that at least a portion of the equipment platform is covered by the material.

2. The golf bag cover attachment of claim 1, wherein the semi-rigid frame structure is also secured to the roof.

3. The golf bag cover attachment of claim 1, wherein the material is removably attached to the semi-rigid frame structure.

4. The golf bag cover attachment of claim 3, wherein the material consists of a fabric selected from the group consisting of canvas, nylon and plastic.

5. The golf bag cover attachment of claim 1, wherein the seat mount includes at least one projection to which the semi-rigid frame structure is removably affixed.

6. The golf bag cover attachment of claim 5, wherein the at least one projection includes a through hole, and wherein the semi-rigid frame structure is removably affixed to the seat mount with a pin placed through the through hole.

7. The golf bag cover attachment of claim 5, wherein the seat mount includes an integral extension member projecting towards the equipment platform.

8. The golf bag cover attachment of claim 5, wherein the seat mount includes a backrest hole, through which a bolt can be placed to mount the seat mount to the backrest.

9. The golf bag cover attachment of claim 8, wherein the at least one projection is laterally displaced from the backrest hole by an elongate portion of the seat mount.

10. The golf bag cover attachment of claim 1, wherein each of the plurality of elongate frame members are u-shaped.

11. The golf bag cover attachment of claim 10, wherein the plurality of elongate frame members are constructed of a material selected from the group consisting of steel, aluminum and plastic.

12. A golf bag cover attachment according to claim 1, wherein the one or more through holes, located in the one or more projections extending generally perpendicularly from the face of the seat mount, are oriented along an axis running substantially parallel to the rear face of the backrest in a horizontal direction.

13. A golf bag cover attachment for use with a golf cart having a seat and a backrest, comprising:

a plurality of elongate frame members, wherein the plurality of elongate frame members are secured together to form a semi-rigid frame structure, and wherein the semi-rigid frame structure is removably secured directly to the rear face of the backrest, and material disposed over at least a portion of the semi-rigid frame structure such that at least a portion of the equipment platform is covered by the material.

14. A golf cart attachment for use with a golf cart having a roof and a seat, comprising:

a plurality of elongate frame members, wherein the plurality of elongate frame members are releasably secured together to form a semi-rigid structure, and wherein the semi-rigid frame structure is secured exclusively to the roof and the rear face of the seat, and material disposed over at least a portion of the semi-rigid frame structure.

* * * * *

UNITED STATES PATENT AND TRADEMARK OFFICE
CERTIFICATE OF CORRECTION

PATENT NO. : 6,481,780 B2
DATED : November 19, 2002
INVENTOR(S) : Dolan et al.

It is certified that error appears in the above-identified patent and that said Letters Patent is hereby corrected as shown below:

<u>Title page,</u>
Item [56], References Cited, U.S. PATENT DOCUMENTS,
"2002/0027337 A1" should read -- 2002/0027373 A1 --.
FOREIGN PATENT DOCUMENTS,
"11/1999" should read -- 8/1999 --.

Signed and Sealed this

Eighth Day of April, 2003

JAMES E. ROGAN
*Director of the United States Patent and Trademark Office*